United States Patent

[11] 3,630,342

[72] Inventor Ostap Danyluke
151 Ridgefield Road, Newtown Square, Pa. 19073
[21] Appl. No. 878,339
[22] Filed Nov. 20, 1969
[45] Patented Dec. 28, 1971

[54] VIBRATORY OR RECIPROCATORY CONVEYOR OR SCREENING APPARATUS
4 Claims, 6 Drawing Figs.

[52] U.S. Cl. ...................................................... 198/220 AC
[51] Int. Cl. ............................................................ B65g 27/00
[50] Field of Search .................................................... 198/220; 209/315, 415, 365; 267/136, 137; 188/76

[56] References Cited
UNITED STATES PATENTS
3,291,289  12/1966  Savage ........................ 198/220 CA
FOREIGN PATENTS
234,759  12/1963  Austria ........................ 267/136

Primary Examiner—Richard E. Aegerter
Attorney—Louis V. Schiavo

ABSTRACT: A vibratory conveyor or screening apparatus of the multiple, parallel deck type is provided with a set of damping devices each including a plurality of springs twice subjected to compression in response to movement of the deck members through each complete cycle of operation.

INVENTOR
OSTAP DANYLUKE

BY *Louis V Schiavo*

ATTORNEY

INVENTOR
OSTAP DANYLUKE
BY
Lorus V. Schiavo
ATTORNEY.

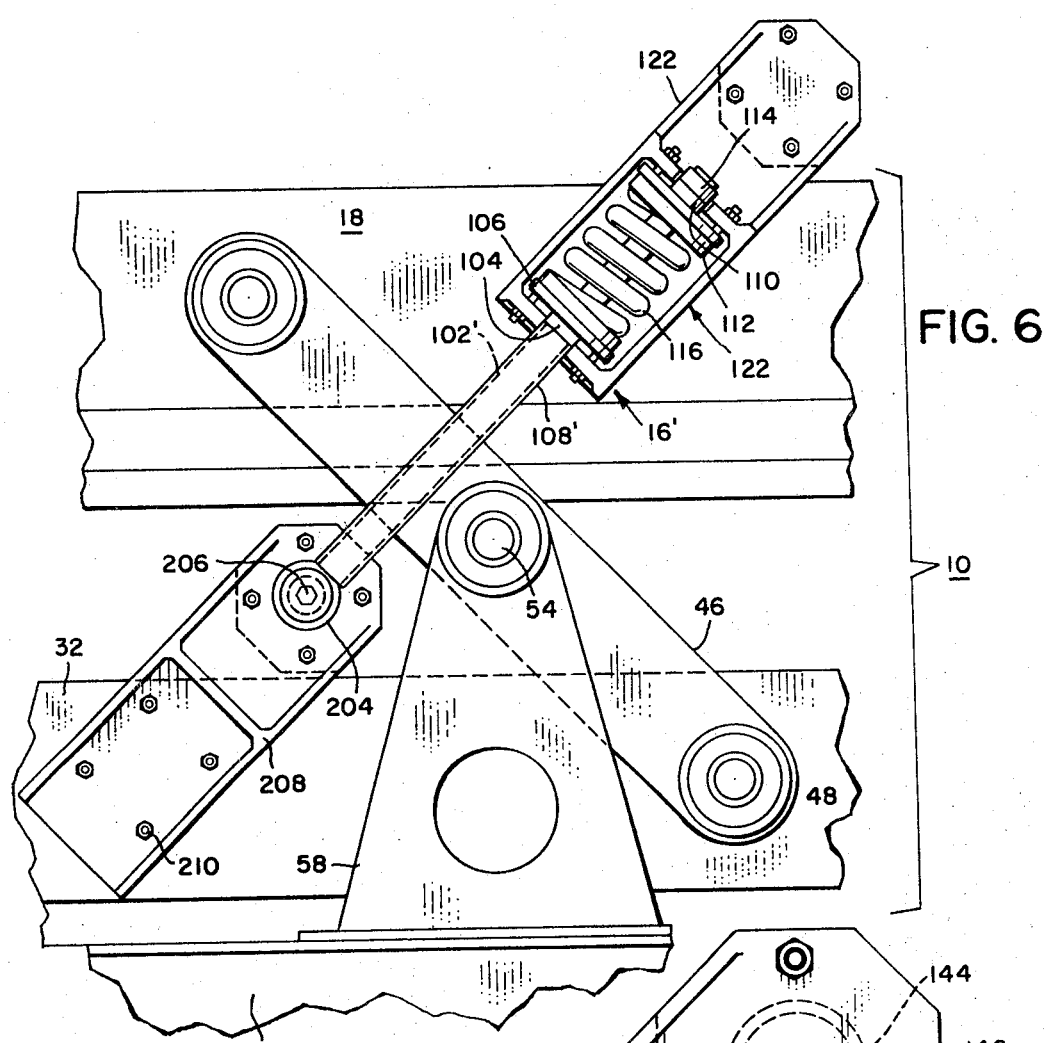
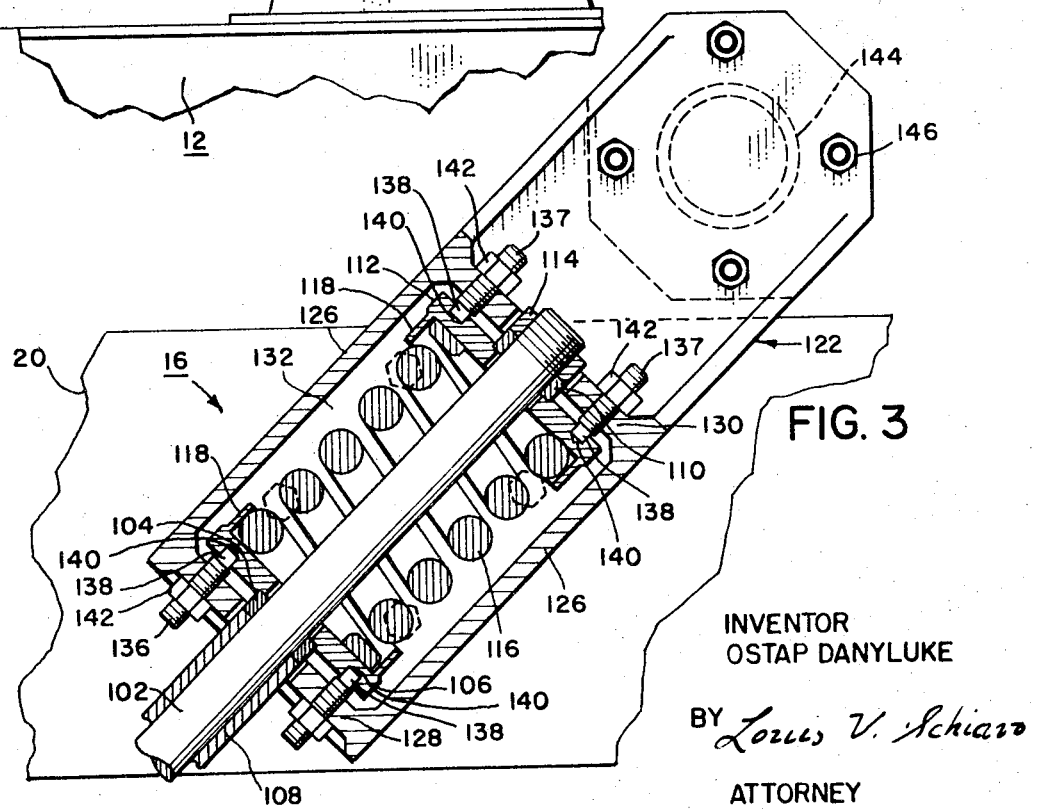
FIG. 6
FIG. 3
INVENTOR
OSTAP DANYLUKE
BY Louis V. Schiaro
ATTORNEY 3,630,342

VIBRATORY OR RECIPROCATORY CONVEYOR OR SCREENING APPARATUS

BACKGROUND OF THE INVENTION

1. Field of the Invention

The present invention relates to vibratory or reciprocatory conveyors or screening apparatus.

2. Description of the Prior Art

Known vibratory two-mass conveyors and screens of the balanced type, widely employed for transporting or sorting particulate materials, such as coal, crushed stone, gravel, various ores, chemicals, refactories, and the like, heretofore have commonly made use of rubber shear block springs or double-closed-end-type helical coil springs for damping the motion of the two masses. Neither rubber shear block springs nor double-closed-end-type helical coil springs has proved entirely satisfactory for the purposes intended.

Rubber shear block springs are difficult to manufacture with consistent characteristics and have to be individually calibrated and selected for proper balancing and tuning. In addition, the characteristics of rubber shear block springs change with time, bringing about a corresponding change in performance, i.e., in the length or direction of stroke.

Closed-end-type helical coil springs are subjected to both tension and compression during each cycle of operation, as a consequence of which the reversal of stresses contributes to a marked decrease in the life of the springs.

SUMMARY OF THE INVENTION

The present invention is directed to damping devices for vibratory conveyors or screening apparatus of the multiple, parallel deck-type wherein the main energy-storing springs are of simple helical coil type, and the arrangement of the devices is such that the springs are never subjected to tension but twice subjected to compression in response to movement of the deck members through each complete cycle of operation. In addition, the arrangement of the devices is such that the springs are readily mounted in and removed from their supports.

DESCRIPTION OF THE DRAWINGS

FIG. 3 is a section of lines III—III in FIG. 2;

FIG. 6 is a fragmentary side elevation of the vibratory screen, showing a modified form of damping device.

Figure 1:
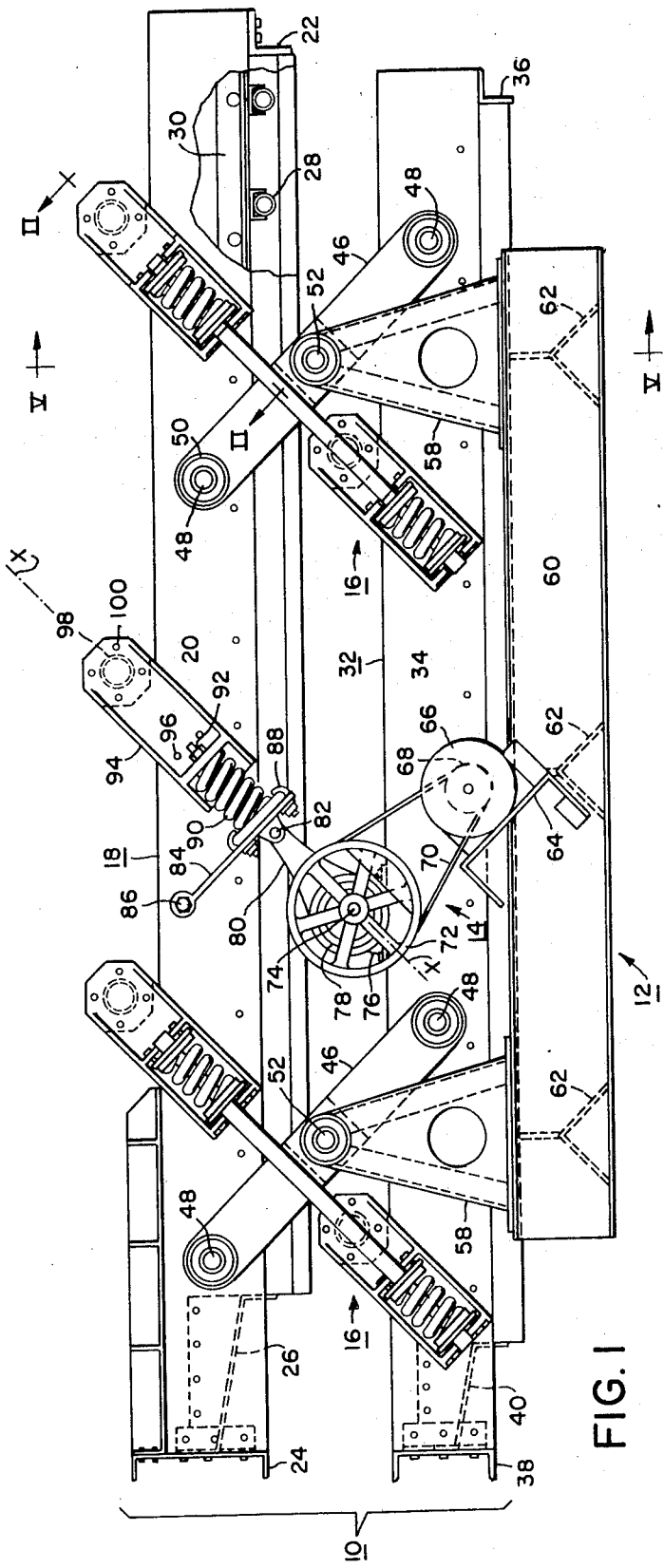
FIG. 1 is a side elevation of a vibratory screen constructed in accordance with the present invention.

The following description is directed to the specific embodiments of the invention shown in the drawings and is not intended to be addressed to the scope of the invention, which may be practiced in a variety of forms.

Figure 4:
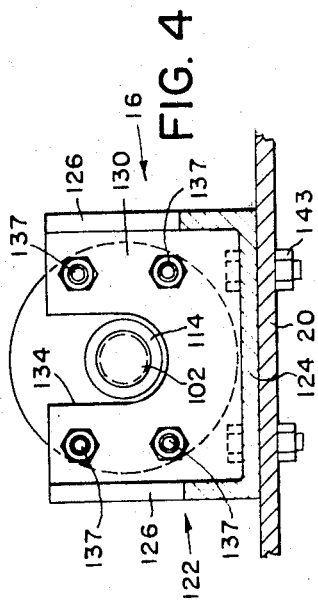
FIG. 4 is a section on lines IV—IV in FIG. 2.
Figure 5:
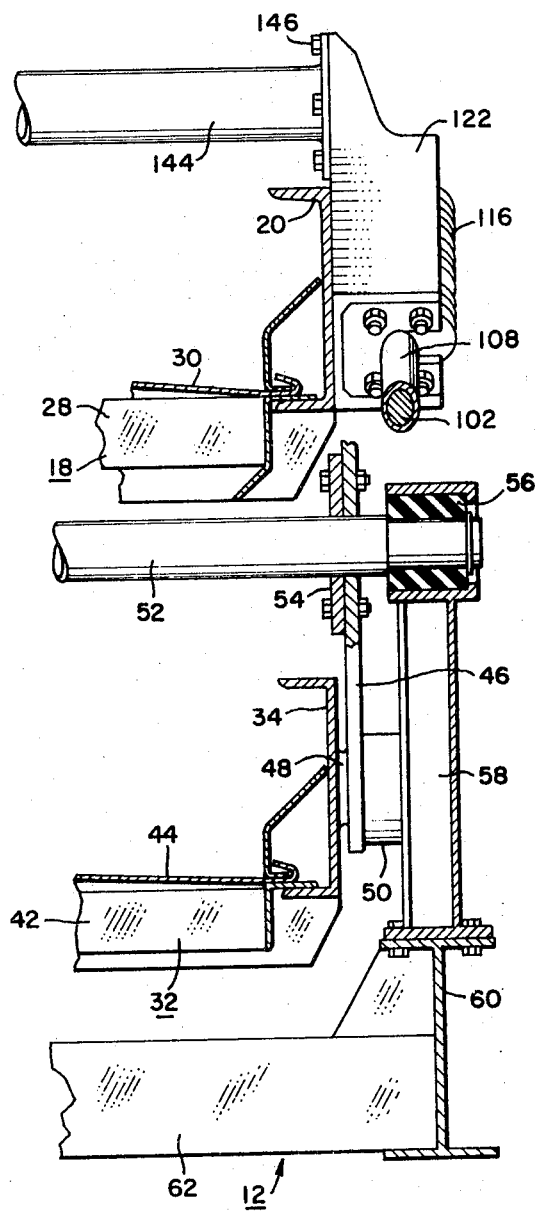
FIG. 5 is a fragmentary section on lines V—V in FIG. 1.
Figure 2:
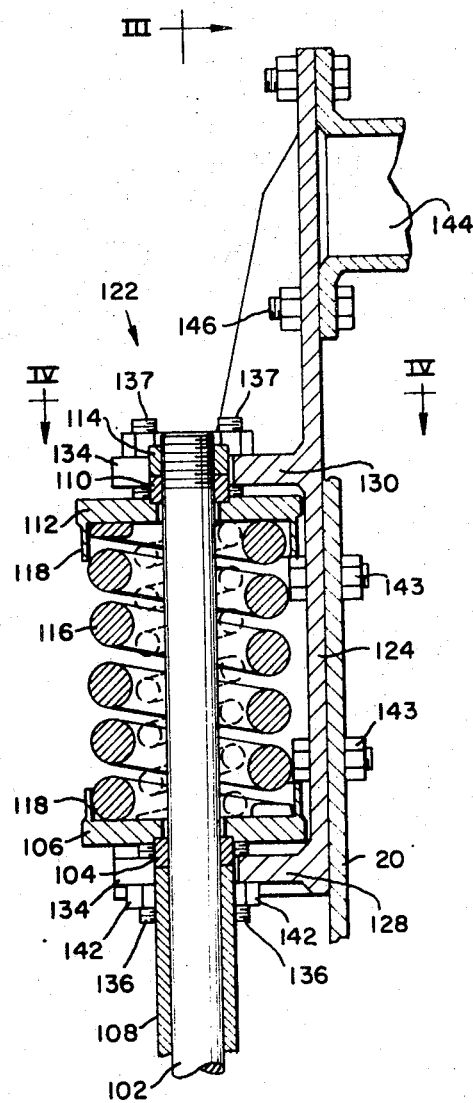
FIG. 2 is an enlarged section on lines II—II in FIG. 1, showing details of the damping device.

Referring to the drawings and particularly to FIGS. 1 through 5, the vibratory screening apparatus constructed in accordance with the present invention comprises a two-deck screen assembly 10 carried by a base frame 12. The assembly is of the balanced type and is provided with a drive mechanism, generally designated 14, and with a set of motion-damping devices 16, two on each side of the apparatus, disposed respectively at the fore and rear ends thereof.

The screen assembly 10 is provided with an upper deck member, generally designated 18, comprising a pair of laterally spaced opposite side channel members 20 interconnected by an angle 22 at the fore end of the assembly and by a channel member 24 at the rear end of the assembly. Extending forwardly from the channel members 24 is an apron plate 26 spanning the channel members 20. Suitably mounted in the opening defined by the channel members 20, the front angle 22 and the apron plate 26 is a structural frame 28 carrying a screen 30.

Disposed in underlying spaced relation to the upper deck member 18 is a lower deck member, generally designated 32, comprising a pair of laterally spaced opposite side channel members 34 interconnected by an angle 36 at the fore end of the assembly and by a channel member 38 at the rear end of the assembly. Extending forwardly from the channel member 38 is an apron plate 40 spanning the channel members 34. Suitably mounted in the opening defined by the channel members 34, the angle 36 and the apron plate 40 is a structural frame 42 carrying a screen 44.

The deck members 18 and 32 are interconnected by a set of link arms 46, two on each side of the apparatus, disposed respectively at the fore and rear ends thereof. The two link arms at the fore end of the apparatus are disposed in a plane extending upwardly and rearwardly. The two link arms at the rear end of the apparatus also are disposed in a plane extending upwardly and rearwardly. The link arms are connected to the deck members by means of pintles 48 extending outwardly from the opposite sides of the deck members and into sleeve bearings 50 carried by the arms 46. Thus the link arms and the upper and lower deck members are pivotally interconnected and conjointly form an articulated parallelogram. At the fore and rear ends of the assembly, the opposite end portions of a shaft 52 respectively extend through the associated link arms 46 and are affixed thereto by collars 54. The shaft 52 is journaled in sleeve bearings 56 carried by pedestals 58 mounted upon the base frame 12. The base frame 12 comprises a pair of laterally spaced frame members 60 interconnected at longitudinally spaced portions thereof by a set of laterally spaced frame members 62. Mounted upon the base frame 12 is a motor base 64.

The motor base 64 carries an electric motor 66. Trained about a motor pulley 68 and a pulley 72 is a V-belt 70. The pulley 72 is affixed to a drive shaft 74, which is carried by a pair of bearings 76 respectively mounted on the opposite side channels 34 of the lower deck member 32.

Affixed to the shaft 74, at each end thereof, is an eccentric 78 embraced by one end portion of a link 80. The other end of the link 80 is pivoted, as at 82, to one end of a bracket 84. The other end of the bracket 84 is pivoted, as at 86, to the upper deck member 18. The bracket 84 is provided with a set of hook bolts 88 which clamp to the bracket the lower end portion of a compression spring 90. The upper end portion of the spring 90 is bolted, as at 92, to a bracket 94 which is affixed, as by bolts 96, to the upper deck member 18. The upper end portions of the brackets 94 extend above the channel members 20 and are interconnected by means of a flanged tubular member 98 bolted to the brackets 94, as by bolts 100.

Each motion-damping device 16 comprises tie means and means connecting the opposite end portions of the tie means respectively with the upper and lower deck members. The tie means comprises a tension bar 102, while each connecting means comprises inner and outer stop means, a compression spring, and support means. The inner stop means comprises a collar 104 and a disc 106 carried by the bar 102 and abutting the end of a tubular compression strut 108 affixed to the bar 102. The outer stop means comprises a collar 110 and a disc 112 carried by the bar 102 and abutting a nut 114 threaded on the bar 102. The compression spring, designated 116, is disposed between the discs 106 and 112. For securing the spring against lateral displacement the discs 106 and 112 are provided with axially extending flanges 118. The support means, generally designated 122, comprises a base wall 124, a pair of longitudinally extending flanges 126 respectively on opposite sides thereof and a pair of transversely extending flanges 128 and 130 respectively disposed at one end of the wall 124 and intermediate the opposite ends thereof. The base wall 124 and the raised flanges 126, 128 and 130 conjointly provide an open boxlike structure, the opening being designated 132. The flanges 128 and 130 are provided with aligned open recesses 134 and respectively mount stop elements 136 and 137 which may be adjusted axially to regulate the initial compression to which the springs 116 are to be subjected, if any. The inner ends of the stops are slidably received by bores 140 in the discs 106 and 112. The outer ends of the stops are provided with locknuts 142. The base wall 124 of the support 122 is bolted, as at 143, to the side of the associated deck member and extends upwardly above the deck member. The opposed supports 122 are interconnected by means of a flanged tubular tie member 144 bolted thereto, as at 146.

It should be noted that, relative to the base frame 12 and the deck members 18 and 32, the link arms 46 are inclined upwardly and rearwardly at an angle of approximately 45° and the motion damping devices 16 are inclined upwardly and forwardly at an angle of approximately 45°. It should also be noted that a plane containing the central longitudinal axes of the drive shaft 74, the springs 90 and the supports 94, designated X—X, is inclined upwardly and forwardly at an angle of approximately 45°. It should be noted further that in practice the angle of inclination for a vibratory screen apparatus is usually between 40° and 45°, while for a vibratory conveyor the angle of inclination is usually approximately 30°.

Now referring to FIG. 6, the modified form of the invention comprises the two-deck screen assembly 10 carried by the base frame 12. The apparatus is provided with the drive mechanism 14, and with modified motion damping devices 16'. Each of the devices 16' includes a tension bar 102' within a tubular strut 108'. Carried by the tension bar 102' are a collar 104, a disc 106, a compression spring 116, a disc 112, a collar 110 and a nut 114, all assembled in the manner and mounted in a support 122 as indicated hereinbefore in connection with the description of the embodiment of FIGS. 1–5. The lower end of the tension bar 102' extends outwardly from the end of the tubular strut 108' and is formed into a flattened eye 204 which is pivotally connected, as at 206, to a suitable support means 208 bolted, as at 210, to the associated side of the lower deck member 32.

In the operation of the apparatus, the motor 66 through the pulleys 68 and 72 and belt 70, drives the shaft 74 and actuates the eccentric 78, which reciprocates the link 80. The link 80 oscillates the bracket 84 about the pivot 86 and alternately compresses and tensions the spring 90. The spring 90, through the bracket 94, causes the two-deck screen assembly 10 to oscillate. The deck members 18 and 32 move horizontally and at the same time vertically in opposite directions along the line of the plane X—X, as understood by those skilled in the art. The apparatus is shown in a neutral condition, wherein the springs 90 and 116 are unstressed.

As the eccentric 78 revolves clockwise through a first quarter turn from the position shown, the upper deck member 18 moves upwardly and forwardly and the lower deck member 32 moves downwardly and rearwardly, each to a first extreme position. As the eccentric revolves through a second quarter turn, the upper deck member 18 moves downwardly and rearwardly and the lower deck member moves upwardly and forwardly, back to their neutral positions. As the eccentric revolves through a third quarter turn, the upper deck member 18 continues to move downwardly and rearwardly and the lower deck member continues to move upwardly and forwardly each to a second extreme position. As the eccentric revolves through the last quarter turn, the upper deck member 18 moves upwardly and forwardly and the lower deck member 32 moves downwardly and rearwardly, back to their neutral positions. Thus, for each revolution of the eccentric 78, the deck members 18 and 32 pass through one complete cycle of operation.

During the first quarter turn of the eccentric 78, the supports 122 move apart, and the elements 136, through the discs 106, compress the springs 116 against the discs 112. The discs 112 are secured against moving with the supports 122 by the collars 110 bearing against the nuts 114. The ends 138 of the elements 137 withdraw only partially form the bores 140. During the second quarter turn of the eccentric 78, the supports 122 move toward each other, and the apparatus is returned to the neutral condition shown, except that the high point of the eccentric is disposed diametrically opposite to the position shown in FIG. 1. During the third quarter turn of the eccentric 78, the supports 122 continue to move toward each other, and the elements 137, through the discs 112, compress the springs 116 against the discs 106. The discs 106 are secured against moving with the supports 122 by collars 104 bearing against the ends of the compression strut 108. The ends 138 of the elements 136 withdraw only partially from the bores 140. During the final quarter turn of the eccentric 78, the supports 122 move apart again and the apparatus is returned to the neutral condition shown, having passed through a complete cycle of operation, during which the springs 116 are compressed twice, but never subjected to tension.

It will be noted that tension bar 102, tubular strut 108, collars 104 and 110, nut 114, discs 106 and 112 and spring 116 may be preassembled and quick detachably mounted in the supports 122 as a unit, with springs 116 unstressed.

Operation of the modified form of the motion-damping device shown in FIG. 6 is similar to operation of the embodiment of FIGS. 1 to 5, already described. The difference is that one spring 116 is used for each device, instead of two.

Although this invention has been described with respect to specific embodiments thereof, it will be appreciated by one skilled in the art that the invention is broad enough to encompass all equivalent embodiments thereof without departing from the spirit and scope of the invention as set forth in the foregoing specification and the appended claims. For example, instead of providing the compression strut 108, the collars 104 may be affixed to the tension bar 102. Furthermore, where one compression spring 116 is provided an additional compression spring nested within compression spring 116 may be provided, as shown in phantom in FIG. 2.

What is claimed is:
1. The combination comprising
   A. upper and lower deck members disposed in mutually overlying relation,
   B. link members inclined relative to said deck members and interconnecting the same to form therewith an articulated assembly in the form of a parallelogram,
   C. a base supporting said assembly,
   D. drive means operable for simultaneously moving said deck members in opposite directions and reciprocating them relative to each other and to said base along a line of movement substantially normal to said link members, and
   E. motion-damping means each including
      a. a bar member extending generally along said line of movement of the deck members, and
      b. means connecting the opposite end portions of said bar member respectively with said upper and lower deck members, at least one of said connecting means including
         1. axially spaced stop means carried by said bar member each including a part fixed against axial movement relative to the bar member, and a part operatively abutting said fixed part and shiftable axially of said bar member,
         2. a compression spring disposed between said shiftable stop parts with the opposite end portions thereof respectively abutting the same, and
         3. support means fixed relative to the associated deck member and engaged with said shiftable stop parts, said support means being operable for compressing said spring operatively first against one of said fixed stop parts when said deck members move in one direction and then against the other of said fixed stop parts when said deck members move in the opposite direction.

2. The combination according to claim 1, wherein the support means mounts elements abutting the shiftable stop parts and adjustable relative to said support means for positioning said shiftable stop parts.

3. The combination according to claim 2, wherein the support means comprises a pair of flanges disposed in overlying relation respectively to the shiftable stop parts, and the adjustable elements extend through said flanges.

4. The combination according to claim 3, wherein the flanges of the support means are provided with aligned open recesses to facilitate assembly of the tie means, stop means and compression spring as a unit with said support means and disconnection of said tie means, stop means and compression spring as a unit from said support means.

* * * * *